(12) United States Patent
Sotty et al.

(10) Patent No.: US 12,145,653 B2
(45) Date of Patent: Nov. 19, 2024

(54) FRONT STRUCTURE FOR AN ELECTRIC VEHICLE

(71) Applicant: ArcelorMittal, Luxembourg (LU)

(72) Inventors: Alexandre Sotty, Compiegne (FR); Nicolas Schneider, Saint Martin Longueau (FR); Yves Drouadaine, Pontoise (FR); Elie Gibeau, Pont-Sainte-Maxence (FR)

(73) Assignee: ArcelorMittal, Luxembourg (LU)

( * ) Notice: Subject to any disclaimer, the term of this patent is extended or adjusted under 35 U.S.C. 154(b) by 257 days.

(21) Appl. No.: 17/640,769

(22) PCT Filed: Jul. 31, 2020

(86) PCT No.: PCT/IB2020/057270
§ 371 (c)(1),
(2) Date: Mar. 4, 2022

(87) PCT Pub. No.: WO2021/044233
PCT Pub. Date: Mar. 11, 2021

(65) Prior Publication Data
US 2022/0315111 A1     Oct. 6, 2022

(30) Foreign Application Priority Data

Sep. 6, 2019  (WO) .................. PCT/IB2019/057513

(51) Int. Cl.
*B62D 25/20*     (2006.01)
*B60K 1/04*     (2019.01)
(Continued)

(52) U.S. Cl.
CPC ............ *B62D 25/2018* (2013.01); *B60K 1/04* (2013.01); *B62D 21/15* (2013.01); *B62D 25/14* (2013.01); *B60K 2001/0438* (2013.01)

(58) Field of Classification Search
CPC ................ B62D 25/20; B62D 25/2018; B62D 25/2045; B62D 21/15; B60Y 2306/01
(Continued)

(56) References Cited

U.S. PATENT DOCUMENTS

| 2017/0029034 A1 | 2/2017 | Faruque et al. |
| 2017/0057559 A1 | 3/2017 | Hong et al. |

(Continued)

FOREIGN PATENT DOCUMENTS

| CN | 204775483 U | 11/2015 |
| CN | 109455223 A | 3/2019 |

(Continued)

OTHER PUBLICATIONS

Search Report of PCT/IB2020/057270 dated Oct. 22, 2020.
(Continued)

*Primary Examiner* — Dennis H Pedder
(74) *Attorney, Agent, or Firm* — Davidson Kappel LLC

(57) ABSTRACT

Front structure for an electric vehicle including a lower dash panel, a seat cross-member and a tunnel nose, such that the tunnel nose is designed to absorb energy in its front portion while resisting intrusion in its rear portion, optimizing the energy absorption in the part during a front crash and protecting the battery pack from being breached by the downward pushing effect of the lower dash panel.

11 Claims, 4 Drawing Sheets

(51) Int. Cl.
*B62D 21/15* (2006.01)
*B62D 25/14* (2006.01)

(58) Field of Classification Search
USPC .... 296/193.07, 9, 29, 30, 204, 187.08, 0.09, 296/1, 203.1, 0.02, 0.03
See application file for complete search history.

(56) References Cited

U.S. PATENT DOCUMENTS

| | | |
|---|---|---|
| 2017/0101132 A1 | 4/2017 | Chung et al. |
| 2017/0106908 A1 | 4/2017 | Song et al. |
| 2017/0297631 A1 | 10/2017 | Schneider et al. |
| 2018/0006584 A1* | 1/2018 | Maier ................ B62D 25/145 |
| 2018/0354560 A1 | 12/2018 | Viaux et al. |
| 2018/0362089 A1 | 12/2018 | Viaux et al. |
| 2019/0081298 A1 | 3/2019 | Matecki et al. |
| 2019/0233015 A1 | 8/2019 | Kasai et al. |
| 2019/0300058 A1 | 10/2019 | Lam et al. |

FOREIGN PATENT DOCUMENTS

| | | |
|---|---|---|
| DE | 102014004591 A1 | 10/2014 |
| EP | 3293077 A1 | 3/2018 |
| JP | 2007083868 A | 4/2007 |
| JP | 2017534509 A | 11/2017 |
| KR | 101974818 B1 | 5/2019 |

OTHER PUBLICATIONS

Written Opinion of PCT/IB2020/057270.
Pascal Dietsch et al. in "Methodology to assess fracture during crash simulation: fracture strain criteria and their calibration", in Metallurgical Research Technology vol. 114, No. 6, 2017.

* cited by examiner

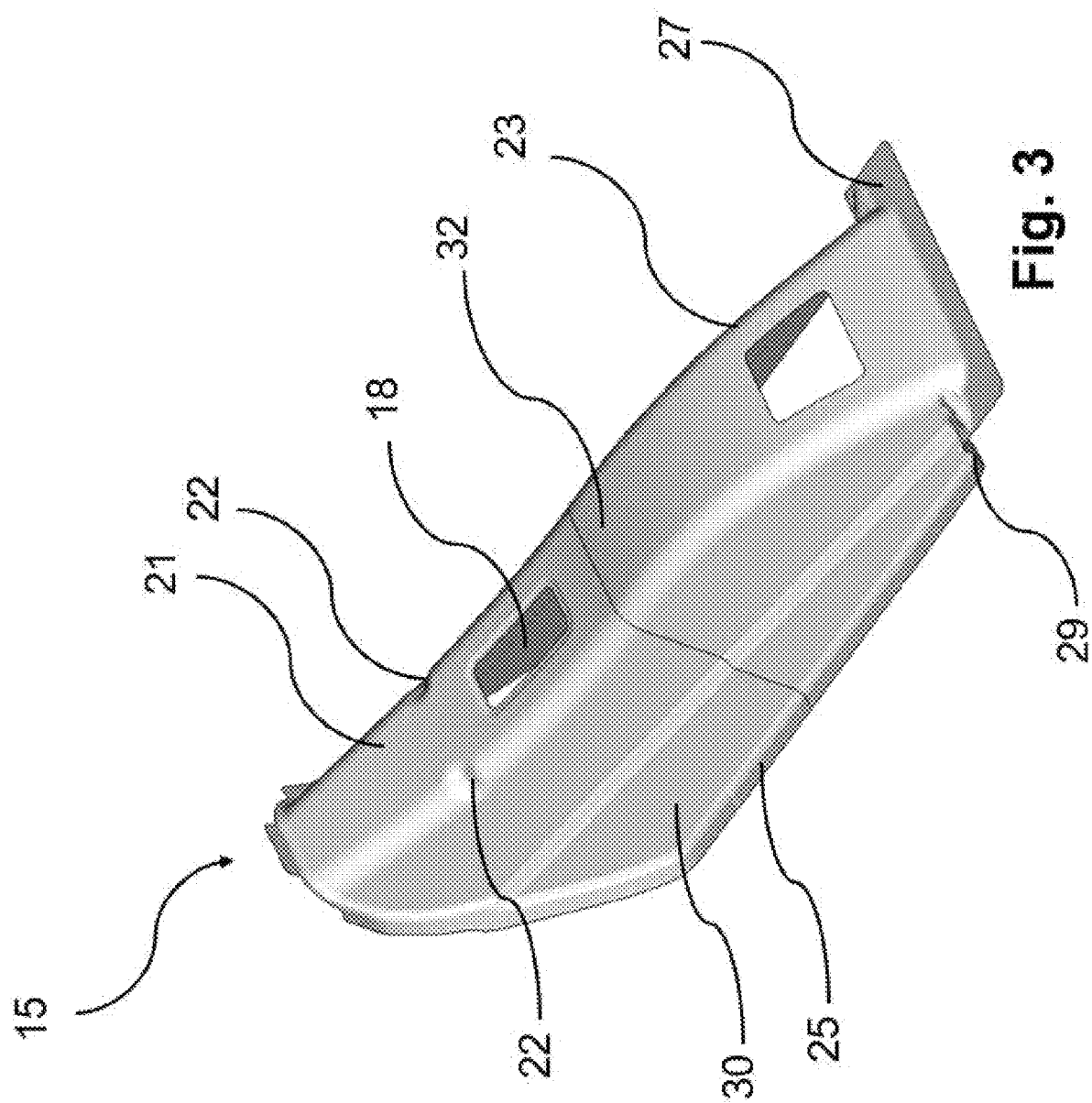

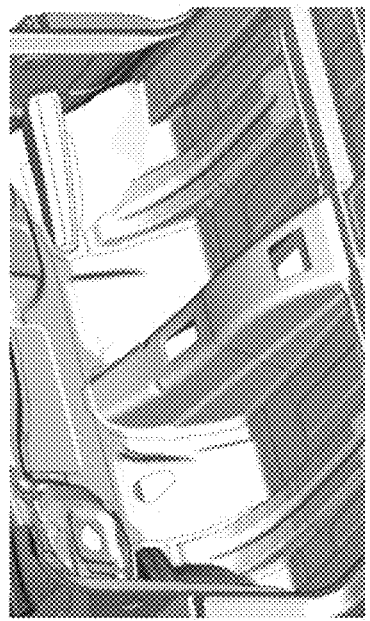
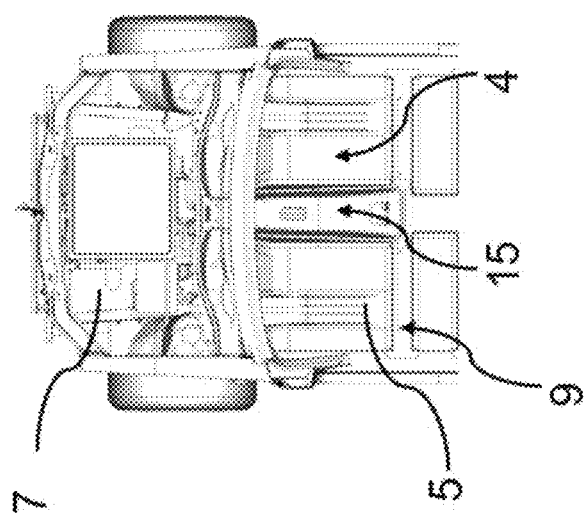
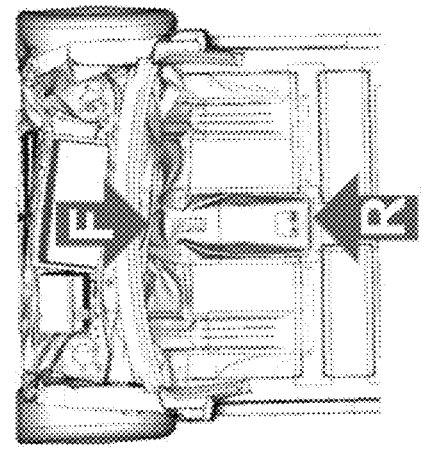
Fig. 4A
Fig. 4B

FRONT STRUCTURE FOR AN ELECTRIC VEHICLE

The present invention relates to a front structure for an automotive vehicle having an electrical powertrain, hereafter referred to as an electric vehicle. The present invention further relates to a method for producing such a front structure.

BACKGROUND

The environmental concerns and regulations associated with the increase of carbon dioxide levels in the atmosphere and with local air pollution levels is pushing for the rise of electrically powered automotive vehicles. Compared to traditional internal combustion engine vehicles, electric vehicles have smaller engines, no fuel tank and no exhaust system. On the other hand, electric vehicles have a sizeable battery pack, which is not present in internal combustion engines.

These notable differences are leading to changes in the global architecture of automotive vehicles. Electric vehicle designs must adapt to the new power train and take opportunity of the extra space afforded by the smaller engine and by the absence of exhaust system and fuel tank. On the other hand, electric vehicles also need to take into account new requirements, such as the extra weight of the battery pack and the need to protect the battery pack in case of an accident.

On an internal combustion engine, the bottom structure of the passenger cabin includes a tunnel, which houses the exhaust system located below the floor panel. The tunnel runs between the front seats and through the middle of the rear floor panel. The tunnel is connected to the lower dash panel structure by a front part, commonly referred to as the nose, which bends upwards to accommodate for the shape of the exhaust manifold in the engine compartment.

SUMMARY OF THE INVENTION

In the case of an electric vehicle, the absence of an exhaust system means that such a tunnel is not required. It can however be interesting to retain a part of the tunnel, namely the front part, or nose, in order to accommodate to make room for equipment related to the battery pack, located beneath the floor panel. For example, it can be interesting to house the electronic power management system in the tunnel nose. Furthermore, the tunnel nose can provide an access point to the electronic power management system and the battery pack itself, which is one of the safety requirements associated with the battery pack.

The front structure of a vehicle must be able to withstand frontal collisions by absorbing energy within the vehicle structure and by guaranteeing that no intrusion occurs within critical areas occupied by the vehicle occupants. In the case of an electric vehicle, further requirements are placed on the behavior of the battery pack in case of a crash. Indeed, if the battery pack is breached, dangerous chemicals can be released from the battery cells leading to health and fire hazards.

One such frontal collision test is the Federal Motor Vehicle Safety Standard 208 (FMVSS 208) in which a vehicle is impacted against a rigid barrier spanning the full width of the vehicle at a speed of 56 km/h.

The presence of the above described stand alone tunnel nose presents a problem for the integrity of the battery pack during a frontal crash. Indeed, the lower dash panel to which the tunnel nose is attached will have a tendency to push the nose downwards during a front crash. This is mainly because the lower dash panel is inclined compared to the vertical direction, with the top of the lower dash panel being closer to the front of the vehicle than the bottom of the lower dash panel. Under the effect of the collision, the front crash management system will tend to push the upper part of the lower dash panel forward, thereby redressing it towards taking a vertical direction. This in turn has the effect of pushing the back of the nose downwards towards the battery pack, which can lead to a catastrophic breach of the battery pack and serious complications for the safety of passengers and rescue teams.

One of the aims of the current invention is to overcome these limitations by proposing a design which ensures that the tunnel nose is not pushed downwards toward the battery pack, while optimizing the energy absorption capacity of the tunnel nose.

To this end the present invention relates to a front structure for an electric vehicle comprising a lower dash panel, a seat cross-member extending in a substantially transverse direction and being attached at either ends to a lateral reinforcement structure of the vehicle and a tunnel nose comprising a front portion at least attached to the lower dash panel,
a rear portion at least attached to the seat cross-member, wherein the product of the ultimate tensile strength by the average thickness of the rear portion is greater than or equal to the product of the ultimate tensile strength by the average thickness of the front portion and wherein the front portion is made from a material having a fracture strain of at least 0.6 and a critical bending angle of at least 75°.

The yield strength, the ultimate tensile strength and the uniform and total elongation are measured according to ISO standard ISO 6892-1, published in October 2009.

By applying the above described invention, it is possible to control the deformation of the tunnel nose during a frontal crash so as to avoid damaging the battery pack. The described invention also allows optimization of the amount of energy absorbed by conferring an energy absorbing role to the front portion.

According to other optional features of the front structure according to the invention, considered alone or according to any possible technical combination:

the material from which the tunnel nose is manufactured has at least an ultimate tensile strength of 700 MPa on the part.
the front portion is equipped with at least one geometrical alteration which locally alters its cross section.
at least part of the tunnel nose is made by hot stamping a material having a tensile strength of at least 1000 MPa after hot stamping.
the composition of the aforementioned press-hardened steel comprises in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration.
at least part of the tunnel nose is made by cold stamping a material having a tensile strength of at least 950 MPa.
at least part of the tunnel nose is made by cold stamping a material having a chemical composition comprising in weight %: $0.13\% < C < 0.25\%$, $2.0\% < Mn < 3.0\%$, $1.2\% < Si < 2.5\%$, $0.02\% < Al < 1.0\%$, with $1.22\% < Si + Al < 2.5\%$, $Nb < 0.05\%$, $Cr < 0.5\%$, $Mo < 0.5\%$, $Ti < 0.05\%$, the remainder being Fe and unavoidable impurities and having a microstructure comprising between 8% and 15% of retained austenite, the remainder being ferrite, martensite and bainite, wherein the sum of martensite and bainite fractions is comprised between 70% and 92%.

at least part of the tunnel nose is made by cold stamping a material having a chemical composition comprising in weight %: %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, the remainder being Fe and unavoidable impurities and having a microstructure comprising between 10% and 20% of retained austenite, the remainder being ferrite, martensite and bainite.

the tunnel nose is formed by stamping a tailor welded blank.

the tunnel nose is formed by stamping a tailor rolled blank.

The present invention further concerns a method for production a rear structure 1 described previously, comprising the steps of:

providing a blank stamping the blank into the shape of the tunnel nose attaching the tunnel nose to the lower dash panel attaching the tunnel nose to the seat cross-member.

BRIEF DESCRIPTION OF THE DRAWINGS

Other aspects and advantages of the invention will appear upon reading the following description, given by way of example, and made in reference to the appended drawings, wherein:

FIG. 3 is an individual perspective view of the tunnel nose according to the invention FIGS. 4A and 4B depict a rear crash test simulation of a vehicle according to the invention, using the FMVSS 208 standardized crash described above. FIG. 4A depicts the situation before the collision occurs, FIG. 4B 100 ms after the impact. Each figure consists of a top view and a perspective view taken from the front of the passenger cabin.

DETAILED DESCRIPTION

In the following description, the terms "upper", "lower", "front", "rear", "transverse" and "longitudinal" are defined according to the usual directions of a mounted vehicle. More particularly, the terms "upper" and "lower", are defined according to the elevation direction of the vehicle, the terms "front", "rear" and "longitudinal" are defined according to the front/rear direction of the vehicle and the term "transverse" is defined according to the width of the vehicle. By "substantially parallel" or "substantially perpendicular" it is meant a direction which can deviate from the parallel or perpendicular direction by no more than 15°.

More particularly, the term "fracture strain" and "critical bending angle" refer to the fracture strain criterion and the critical bending angle criterion defined by Pascal Dietsch et al. in "Methodology to assess fracture during crash simulation: fracture strain criteria and their calibration", in Metallurgical Research Technology Volume 114, Number 6, 2017. The critical bending angle defines the angle at which the first cracks are detected on the extrados of a sample which has been deformed according to the standardized VDA-238-100 Standard. The fracture strain is the associated equivalent strain within the material at the point of the deformation when the critical bending angle has been reached.

The yield strength, the ultimate tensile strength and the uniform and total elongation are measured according to ISO standard ISO 6892-1, published in October 2009.

The average thickness of a part or a portion of a part is the thickness of the corresponding area of the sheet which is used to produce said part.

The term "controlled buckling" refers to the mode of deformation of a part subjected to a compressive load, where the part progressively absorbs the mechanical energy of the compressive load by forming a series of successive waves resulting from successive local buckling deformations of the part. As a result, the length of the part as measured in the direction of the compressive load is smaller after the deformation than the initial length of the part in said direction. In other words, when a part reacts to a compressive load by controlled buckling, it folds onto itself in the same way as a plastic bottle on which a compressive load is applied between the top and the bottom of the bottle.

Figure 1:
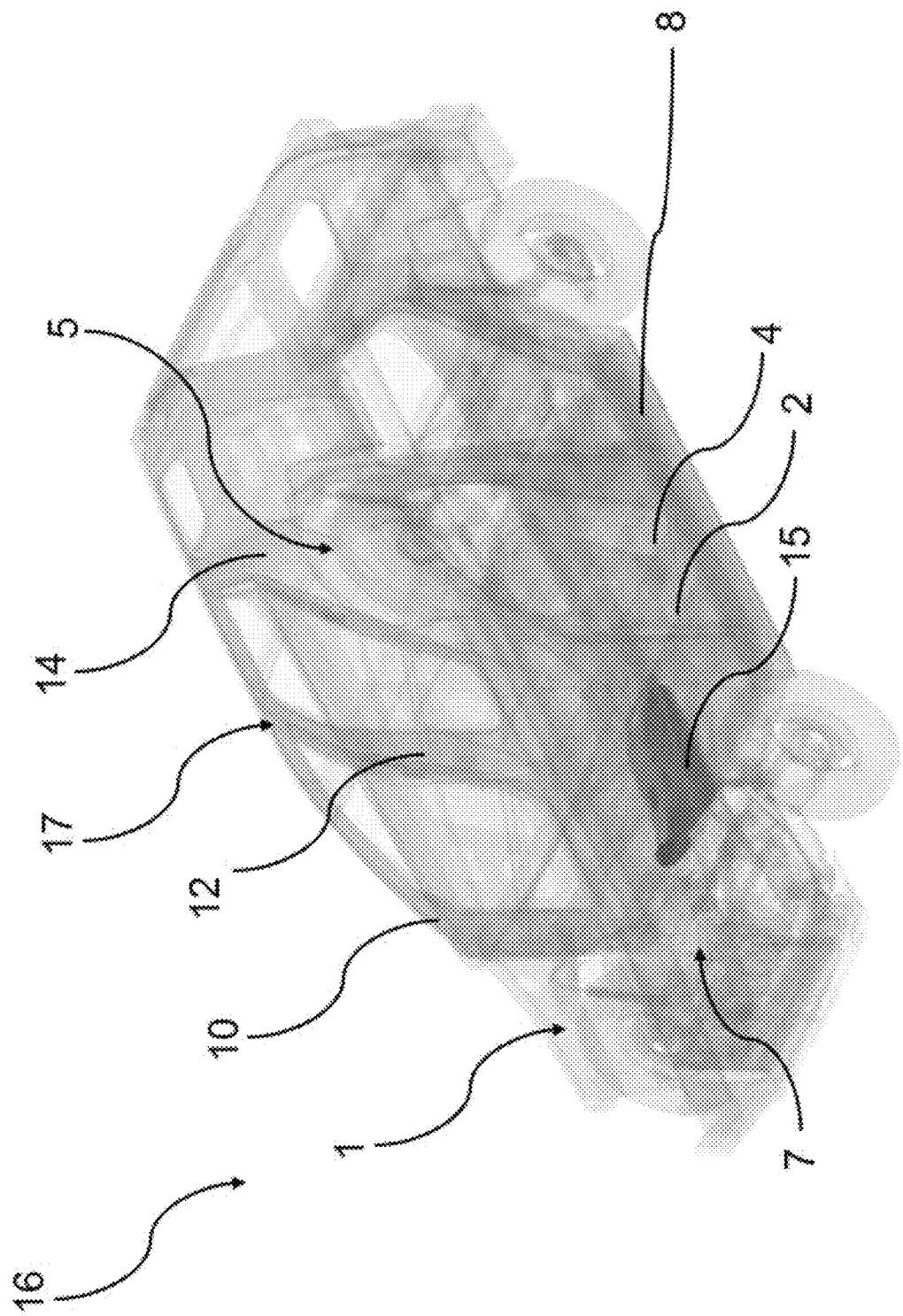
FIG. 1 is an overall perspective view of a vehicle according to the invention
Figure 2:
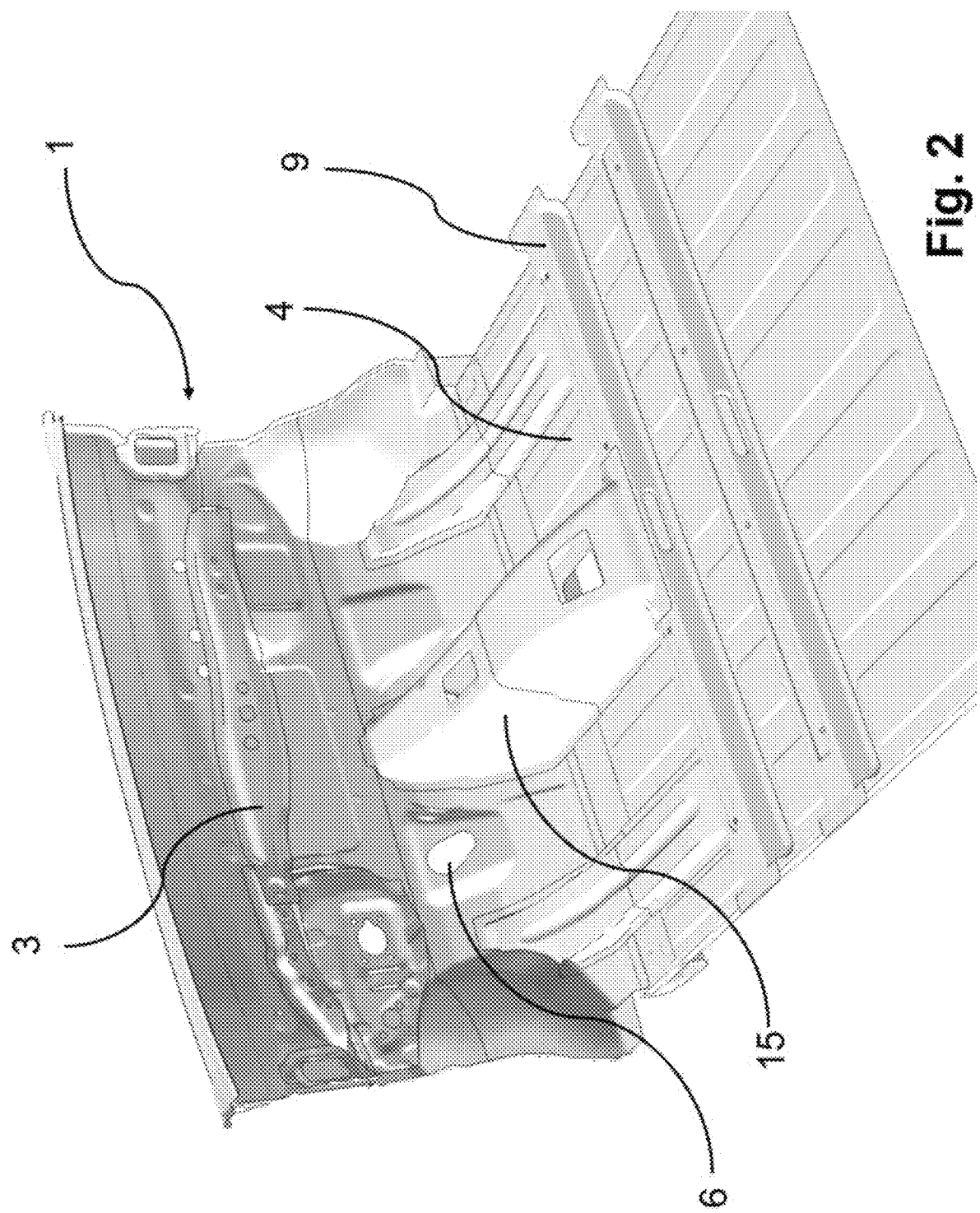
FIG. 2 is an overall perspective view of the front structure according to the invention

Referring to FIGS. 1 and 2, a front structure 1 of an electric vehicle 16 having a battery pack 2, located beneath a floor panel 4 of the passenger cabin 5 is described. The front structure 1 comprises at least:

a lower dash panel 3 separating the passenger cabin 5 and the front engine compartment 7, a seat cross-member 9 extending in a substantially transverse direction and being attached at either ends to a lateral reinforcement structure 13 of the vehicle, a tunnel nose 15 located substantially in the middle of the passenger cabin 5 width-wise The front structure 1 is connected to the lateral reinforcement structure 17 on either side of the vehicle. The lateral reinforcement structure 17, comprises for example the following elements: a side sill 8 running longitudinally along the bottom of the body of the vehicle, a front pillar or A pillar 10 located at the front of the front door with a lower part connected to the side sill 8 and an upper part going up to the roof of the vehicle, a center pillar or B pillar 12, located between the front and back doors and a rear pillar or C pillar 14, located behind the back door.

The lower dash panel 3 is a large panel closing the passenger cabin 5 at its lower front end. It is connected to the lateral reinforcement structure 17 on its sides and to the front end of the floor panel 4 at its bottom end. It generally features several apertures 6 intended for the steering column or pedals for the driver. Its main function is to separate the passenger cabin 5 from the engine compartment 7 and as such does not have a major structural role in case of a front crash. It is generally made of a soft material, able to be deformed in the complex shape that the vehicle designer will require of this part and with a low average thickness, so as not to penalize the overall weight of the vehicle. For example, the lower dash panel 3 is made of steel designed for deep drawing having an average thickness comprised between 0.5 mm and 0.9 mm and an ultimate tensile strength below 350 MPa.

The lower dash panel 3 is generally slanted compared to a vertical plane, the bottom part of the lower dash panel 3 being further back than the top part of the lower dash panel 3. This is due to the general shape of the engine compartment 7 and to the need for mechanical elements of the chassis in the lower front part of the vehicle.

The seat cross member 9 is a structural part designed to reinforce the overall rigidity of the vehicle and to provide support for the lateral reinforcement structure 17. In a particular embodiment, depicted in FIG. 2, the seat cross member 9 has a U-Shape cross section with two side walls and one top wall. It is also possible to design a tubular seat cross member 9 or any other shape which is deemed appropriate to its function.

In a particular embodiment, the seat cross member 9 is attached to the floor panel 4. For example, the seat cross member 9 is attached by welding it on top of the floor panel 4 as depicted in FIG. 2.

In the event of a lateral collision, the seat cross member 9 acts as an anti-intrusion part, protecting the driver and passenger from intrusion of the impactor. As such, it is usually manufactured using very high strength steel, which does not need to exhibit a high ductility when mounted on the vehicle, because it is not expected to absorb energy by deforming under the effect of the impact, but rather it is expected to keep its shape and length as much as possible. For example, the seat cross member is made of a material having an ultimate tensile strength higher than 1800 MPa and having a material average thickness before forming comprised between 1.3 mm and 2.0 mm.

The seat cross member 9 is attached to the lateral reinforcement structure 17 on either side of the vehicle. For example, the seat cross member 9 is attached to the lateral reinforcement structure 17 by spot welding. For example, the seat cross member 9 is attached to the lateral reinforcement structure 17 by welding it onto the side sill 8.

Referring to FIGS. 2 and 3, the tunnel nose 15 has two side walls 30 and a top wall 32. The inner volume delimited by the inside of the tunnel nose 15 can be used for example to house the electronic power management system of the battery pack 2. In a particular embodiment, the tunnel features apertures 18, for example within the top wall 32, intended to access the elements housed within the inner volume. The tunnel nose 15 comprises at least a front portion 21 and a rear portion 23. The front portion 21 is attached at least to the lower dash panel 3, for example by welding a flange 25 of the tunnel nose 15 on to the lower dash panel 3. The rear portion 23 is attached at least to the seat cross member 9, for example by welding a flange 27 of the rear portion onto the seat cross member 9.

The tunnel nose 15 is designed in such a way that the product of the ultimate tensile strength by the average thickness of the rear portion 23 is greater than or equal to the product of the ultimate tensile strength by the average thickness of the front portion 21. This product is a reflection of the deformability under loading. Because it is greater or equal on the rear portion 23 than on the front portion 21, when the part is submitted to a load, for example a compressive loading applied on both ends, the front portion 21 will have a tendency to deform before the rear portion 23. The tunnel nose 15 is also designed such that the front portion 21 is made from a material having a fracture strain of at least 0.6 and a critical bending angle of at least 75°. This allows the front portion 21 to deform without breaking during a front crash, as will be further detailed below.

In a particular embodiment, the tunnel nose 15 is further attached to the floor panel 4 on part of the front portion 21 and/or the rear portion 23. For example, the tunnel nose 15 is attached by spot welding the flange 25 to the floor panel 4.

In the event of a front collision, for example simulated by the standardized crash test FMVSS 208 described previously, the impact force will first have the effect of compressing the engine compartment 7, as depicted in FIG. 4B. The thus compressed engine compartment 7 then exerts its load onto the lower dash panel 3, which will be deformed, as can be seen on FIG. 4B. The load will also be transmitted to the tunnel nose 15. Because the front portion 21 has a tendency to deform before the rear portion 23, as was previously explained, the front portion 21 will be deformed by the transmitted impact force. More precisely, the transmitted impact force F will be countered by the reaction force R exerted by the seat cross member 9, as depicted in FIG. 4. Under the compressive load resulting from the conjoined effect of the mechanical forces F and R, the front portion 21 will deform by folding onto itself, thereby mechanically absorbing a high amount of energy from the crash. This contributes to the overall energy absorption of the front structure, which acts to protect the vehicle occupants as well as the battery pack 2.

Furthermore, by folding onto itself, the front portion 21 prevents the rear portion 23 from moving under the effect of the transmitted impact force F, which prevents the rear portion 23 from breaching into the battery pack 2, located beneath the tunnel nose 15.

In a particular embodiment, depicted in FIGS. 3, 4A and 4B, the front portion 21 is equipped with geometrical alterations 22. Said geometrical alterations locally modify the cross section of the front portion 21 and therefore act as triggers for deformation under compressive load. Advantageously, this allows the vehicle designer to control the location of the onset of deformation under compressive loading.

In a particular embodiment, depicted in FIG. 3, the rear portion 23 comprises a step 29 at its rear end, designed to accommodate for the shape of the rear cross member 9. Indeed, because the volume below the floor panel 4 is generally occupied by the battery pack 2, it is advantageous to design a seat cross member 9 which is located above the floor panel 4. In such a case, it is advantageous to include a step 29 at the rear end of the rear portion 23, which has a complementary shape to that of the seat cross member 9. This will allow to maximize the surface of attachment between the rear portion 23 and the seat cross member 9, and it will also increase the support and resistance effect to counteract the transmitted impact force F by the resistance force R during a front crash.

In a particular embodiment, the material from which the tunnel nose 15 is made has an ultimate tensile strength of at least 700 MPa. Advantageously, this guarantees a structural stability to the tunnel nose 15 and also ensures that the tunnel nose 15 will absorb an important amount of energy when deforming during a collision.

In a particular embodiment, at least part of the tunnel nose 15 is made by hot stamping a material having a tensile strength of at least 1000 MPa after hot stamping. Advantageously, the use of hot stamping technology enables to produce complex shapes with high resistance and no springback issues after forming. Furthermore, using high strength material with more than 1000 MPa mechanical resistance on the final part ensures a high energy absorption during a collision.

For example, the above mentioned press-hardened steel comprises in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration.

In a particular embodiment, at least part of the tunnel nose 15 is made by cold stamping a material having a tensile strength of at least 950 MPa. Advantageously, the use of high strength material with more than 950 MPa mechanical resistance on the final part ensures a high energy absorption during a collision. Furthermore, using cold stamping rather than hot stamping as mentioned in the previous embodiment, can reduce manufacturing costs.

For example, the tunnel nose 15 is made by cold stamping a material having a chemical composition comprising in weight %: 0.13%<C<0.25%, 2.0%<Mn<3.0%, 1.2%<Si<2.5%, 0.02%<Al<1.0%, with 1.22%<Si+Al<2.5%, Nb<0.05%, Cr<0.5%, Mo<0.5%, Ti<0.05%, the remainder being Fe and unavoidable impurities and having a microstructure comprising between 8% and 15% of retained austenite, the remainder being ferrite, martensite and bainite, wherein the sum of martensite and bainite fractions is comprised between 70% and 92%.

In another example, the tunnel nose 15 is made by cold stamping a material having a chemical composition comprising in weight %: %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, the remainder being Fe and unavoidable impurities and having a microstructure comprising between 10% and 20% of retained austenite, the remainder being ferrite, martensite and bainite.

According to a particular embodiment, the tunnel nose 15 is made by stamping a tailor welded blank. The tailor welded blank can be made of materials of different average thicknesses and strength levels for cold stamping. Alternatively, it can be made of materials of different average thicknesses and strength levels for hot stamping. Advantageously, using different grades and average thicknesses allows more flexibility to the designer to optimize the performance and weight of the part. For example, the front portion 21 is made of a material having a lower average thickness and/or a lower ultimate tensile strength than the rear portion 23.

According to a particular embodiment, the tunnel nose 15 is made by stamping a tailor rolled blank. This provides similar advantages as in the case of a tailor welded blank, explained previously. For example, the front portion 21 will be made of a material having a lower average thickness than the rear portion 23.

In a particular embodiment, the tunnel nose 15 is made of a material having an average thickness comprised between 0.8 mm and 2.0 mm. For example, the tunnel nose 15 is made by hot stamping a tailor welded blank having a first portion, corresponding to the front portion 21, consisting of a material having an average thickness of 1.1 mm and an ultimate tensile strength above 1000 MPa after hot stamping and a second portion, corresponding to the rear portion 23, having a material average thickness of 0.9 mm and an ultimate tensile strength above 1500 MPa after hot stamping. It can be verified that the product of the ultimate tensile strength by the average thickness of the rear portion 23, which is 1200 MPa·mm, is higher than that of the front portion 21, which amounts to 1100 MPa·mm.

The Method for producing the above described rear structure will now be described. It comprises the steps of:
  providing a blank
  stamping the blank into the shape of the tunnel nose
  attaching the tunnel nose to the lower dash panel; and
  attaching the tunnel nose to the seat cross-member.

What is claimed is:

1. A front structure for an electric vehicle, the front structure comprising:
  a lower dash panel separating a passenger cabin and a front engine compartment,
  a seat cross-member extending in a transverse direction and being attached at either ends to a lateral reinforcement structure; and
  a tunnel nose including:
    a front portion at least attached to the lower dash panel, and
    a rear portion at least attached to the seat cross-member;
  wherein a product of the ultimate tensile strength by an average thickness of the rear portion is greater than or equal to a further product of the ultimate tensile strength by the average thickness of the front portion and wherein the front portion is made from a material having a fracture strain of at least 0.6 and a critical bending angle of at least 75°.

2. The front structure as recited in claim 1 wherein the material from which the tunnel nose is manufactured has at least an ultimate tensile strength of 700 MPa.

3. The front structure as recited in claim 1 wherein the front portion has at least one geometrical alteration locally altering a cross section.

4. The front structure as recited in claim 1 wherein at least part of the tunnel nose is made by hot stamping a material having a tensile strength of at least 1000 MPa after hot stamping.

5. The front structure as recited in claim 4 wherein the material is a press-hardened steel having a composition comprising in % weight:
  −0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, a remainder being iron and unavoidable impurities resulting from the elaboration.

6. The front structure as recited in claim 1 wherein at least part of the tunnel nose is made by cold stamping a material having a tensile strength of at least 950 MPa.

7. The front structure as recited in claim 6 wherein a chemical composition of the material of the at least part of the tunnel nose comprises in weight %: 0.13%<C<0.25%, 2.0%<Mn<3.0%, 1.2%<Si<2.5%, 0.02%<Al<1.0%, with 1.22%<Si+Al<2.5%, Nb<0.05%, Cr<0.5%, Mo<0.5%, Ti<0.05%, a remainder being Fe and unavoidable impurities, the at least part of the tunnel nose having a microstructure comprising between 8% and 15% of retained austenite, a microstructure remainder being ferrite, martensite and bainite, wherein a sum of martensite and bainite fractions is between 70% and 92%.

8. The front structure as recited in claim 6 wherein a chemical composition of the material of the at least part of the tunnel nose comprises in weight %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, a remainder being Fe and unavoidable impurities, the at least part of the tunnel nose having a microstructure comprising between 10% and 20% of retained austenite, the remainder being ferrite, martensite and bainite.

9. The front structure as recited in claim 1 wherein the tunnel nose is formed by stamping a tailor welded blank.

10. The front structure as recited in claim 1 wherein the tunnel nose is formed by stamping a tailor rolled blank.

11. A method to produce the front structure as recited in claim 1 comprising the steps of:
  providing a blank;
  stamping the blank into the shape of the tunnel nose;
  attaching the tunnel nose to the lower dash panel; and
  attaching the tunnel nose to the seat cross-member.

* * * * *